United States Patent [19]

Cosper

[11] Patent Number: 4,734,258
[45] Date of Patent: Mar. 29, 1988

[54] MORPHOLINOHEXOSE REDUCTONE AS AN OXYGEN SCAVENGER

[75] Inventor: David R. Cosper, Downers Grove, Ill.

[73] Assignee: Nalco Chemical Company, Naperville, Ill.

[21] Appl. No.: 82,877

[22] Filed: Aug. 7, 1987

[51] Int. Cl.$^4$ ........................... C02F 1/20; C23F 11/06
[52] U.S. Cl. ...................................... 422/16; 210/750; 252/188.28
[58] Field of Search ............................... 210/698, 750; 422/14–17; 252/180, 181, 188.28

[56] References Cited

U.S. PATENT DOCUMENTS

| | | | |
|---|---|---|---|
| 4,067,690 | 1/1978 | Cuisia et al. | 422/16 |
| 4,278,635 | 7/1981 | Kerst | 210/750 X |
| 4,389,327 | 6/1983 | Rothgery et al. | 210/750 X |
| 4,410,619 | 10/1983 | Kubbota et al. | 430/234 |
| 4,479,917 | 10/1984 | Rothgery et al. | 210/750 X |
| 4,487,748 | 12/1984 | Weiss et al. | 210/750 X |
| 4,657,740 | 4/1987 | Feldman | 210/750 X |

*Primary Examiner*—Tom Wyse
*Attorney, Agent, or Firm*—John G. Premo; Anthony L. Cupoli; Donald G. Epple

[57] ABSTRACT

An improved method for scavenging dissolved oxygen from industrial waters which comprises treating said waters with at least 1 ppb of morpholinohexose reductone.

1 Claim, 3 Drawing Figures

MORPHOLINOHEXOSE REDUCTONE AS AN OXYGEN SCAVENGER

Dissolved oxygen in water is undesirable when such waters are used in industrial applications. Oxygen containing waters cause corrosion in such industrial equipment as boilers, heat exchangers, and oil well equipment.

A common method of combating this problem is to scavenge oxygen with chemicals. The invention deals with an improved chemical for scavenging oxygen that is efficient and is organic and readily available.

Figure 1:
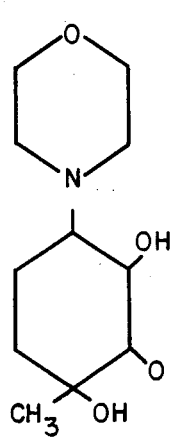
Figure 2:
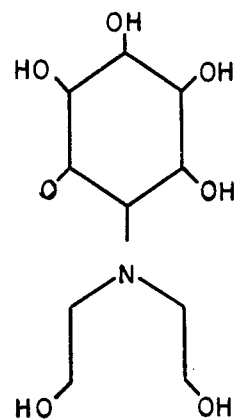
Figure 3:
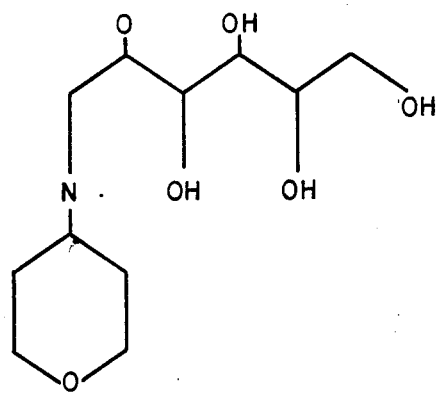

FIGS. 1–3 illustrate the structure of some disclosed organic compounds.

THE INVENTION

In accordance with the invention, it has been found that oxygen may be scavenged from industrial waters by using from about between 1 to 1,000 ppb by weight in the water of 2,5-dihydroxy-5-methyl-3-(4-morpholinyl)-2-cyclopenten-2-one, also known as morpholinohexose reductone. This material is illustrated as FIG. 1. A preferred dosage is 20–500 ppb in a typical industrial water system or about 2 parts to 50 parts of morpholinohexose reductone per part of oxygen by weight.

TEST METHOD

Initial kinetic studies of scavengers with dissolved oxygen were carried out at 32° C.±0.1° in air-saturated 0.025M $NaHCO_3$ containing about $2.5 \times 10^{-4}$M oxygen. These reactions were carried out in a 500-ml round bottom flask equipped with a pH electrode, an Orion Model 97–08 oxygen electrode, thermometer and a septum-covered port for injection for scavenger and catalyst solutions and immersed in a thermostated water bath. The reaction was stirred continuously with a 1-inch Teflon-coated magnetic bar. After injection of scavenger and catalyst, the disappearance of oxygen was followed with the Orion electrode signal.

High-temperature measurements of effectiveness were carried out by passing a dilute, aerated solution of scavenger at 40 ml/min through a 20 ft. by ¼ inch copper coil heated to 190° F. Concentrations of oxygen are measured before and after the coil with Orion Model 97–08 electrodes.

EVALUATION OF THE INVENTION

Using the above test method, the results using morpholinohexose reductone in comparison with other known or proposed oxygen scavengers is presented below in Table I. The comparison with isoascorbic acid, a well-known industrial scavenger, is particularly illustrative in demonstrating the efficacy of the invention. Two additional condensation products of hexose and amines are illustrated in FIGS. 2 and 3 and are included in Table II. Neither material reacts with dissolved oxygen at a detectable rate.

TABLE I

Oxygen Scavenging Tests at 32° C. ± 0.1°
Examples of Typical Results[a]

| Scavenger | Conc. $M \times 10^4$ | [cu(II)] $\times 10^{4,b}$ | pH | Initial Rate $M/s \times 10^{7,c}$ |
|---|---|---|---|---|
| Morpholinohexose reductone | 5.5 | 0 | 9.6 | 2.2 |
| Morpholinohexose reductone | 5.5 | 0.16 | 9.6 | 40.5 |
| Diethanolaminohexose | 5.7 | 0 | 9.4 | 0 |
| morpholinohexose | 5.6 | 0.16 | 9.4 | 0 |
| isoascorbic acid | 5.6 | 0 | 9.6 | 1.1 |
| dihydroxyacetone | 3.77 | 0.16 | 10.1 | 0.66 |
| dihydroxyacetone | 16.7 | 0 | 9.3 | 0 |
| dihydroxyacetone | 16.7 | 0.16 | 9.3 | 0.62 |
| fructose | 8.3 | 0 | 10.0 | 0.66 |
| fructose | 8.3 | 0.16 | 10.0 | 0.66 |
| hydroxylamine | 3.6 | 0.24 | 9.35 | 13.0 |
| hydroxylamine | 15.0 | 0 | 9.35 | 0.01 |
| aminoguanidine | 11.0 | 0 | 10.0 | 0.10 |
| aminoguanidine | 11.0 | 0.16 | 10.0 | 2.3 |

Notes:
[a]Kinetic runs in air-saturated 0.025M $NaHCO_3$ adjusted to pH with NaOH;
[b]as $CuSO_4$;
[c]Initial rate = $-d[O_2]/dt$ at time = O; as comparison 1 ppm/min = $5.2 \times 10^{-7}$M/s.

TABLE II

High Temperature (~88° C.) Testing of Various Oxygen Scavengers Oxygen reduced (as %) at various mole ratios of reactants ($[scavenger]_o:[O_2]_o$)[a,b]

| Scavengers | 1 | 1.5 | 2 | 2.5 | 4 | 5 | 8 | 10 |
|---|---|---|---|---|---|---|---|---|
| Morpholinohexose reductone (I) | 47% | — | 79% | — | 86% | — | 88% | — |
| Dihydroxyacetone | 0 | — | — | 15% | — | 81% | — | — |
| Aminoquanidine (Acetate) | 42 | 35 | 54 | — | 46 | — | 58 | — |

NOTES:
[a]% reduction after 11 minutes of continuous steady flow
[b]Values calculated as % reduction = $\frac{[O_2]_o - [O_2]_t}{[O_2]_o} \times 100\%$

I claim:
1. An improved method for scavenging dissolved oxygen from industrial waters which comprises treating said waters with at least 1 ppb of morpholinohexose reductone.

* * * * *

UNITED STATES PATENT AND TRADEMARK OFFICE
CERTIFICATE OF CORRECTION

PATENT NO. : 4,734,258

DATED : March 29, 1988

INVENTOR(S) : David R. Cosper

It is certified that error appears in the above-identified patent and that said Letters Patent is hereby corrected as shown below:

The title page and sheet 1 of the drawing containing figures 1, 2, 3 should appear as shown on the attached sheets.

United States Patent [19]

Cosper

[11] Patent Number: 4,734,258
[45] Date of Patent: Mar. 29, 1988

[54] MORPHOLINOHEXOSE REDUCTONE AS AN OXYGEN SCAVENGER

[75] Inventor: David R. Cosper, Downers Grove, Ill.

[73] Assignee: Nalco Chemical Company, Naperville, Ill.

[21] Appl. No.: 82,877

[22] Filed: Aug. 7, 1987

[51] Int. Cl.⁴ .................. C02F 1/20; C23F 11/06
[52] U.S. Cl. .................. 422/16; 210/750; 252/188.28
[58] Field of Search .................. 210/698, 750; 422/14–17; 252/180, 181, 188.28

[56] References Cited

U.S. PATENT DOCUMENTS

| | | | |
|---|---|---|---|
| 4,067,690 | 1/1978 | Cuisia et al. | 422/16 |
| 4,278,635 | 7/1981 | Kerst | 210/750 X |
| 4,389,327 | 6/1983 | Rothgery et al. | 210/750 X |
| 4,410,619 | 10/1983 | Kubbota et al. | 430/234 |
| 4,479,917 | 10/1984 | Rothgery et al. | 210/750 X |
| 4,487,748 | 12/1984 | Weiss et al. | 210/750 X |
| 4,657,740 | 4/1987 | Feldman | 210/750 X |

Primary Examiner—Tom Wyse
Attorney, Agent, or Firm—John G. Premo; Anthony L. Cupoli; Donald G. Epple

[57] ABSTRACT

An improved method for scavenging dissolved oxygen from industrial waters which comprises treating said waters with at least 1 ppb of morpholinohexose reductone.

1 Claim, 3 Drawing Figures

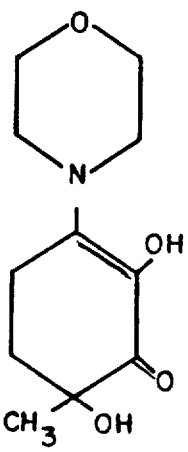

UNITED STATES PATENT AND TRADEMARK OFFICE
CERTIFICATE OF CORRECTION

PATENT NO. : 4,734,258
DATED : MARCH 29, 1988
INVENTOR(S) : DAVID R. COSPER

Page 3 of 3

It is certified that error appears in the above-identified patent and that said Letters Patent is hereby corrected as shown below:

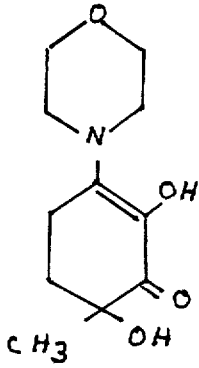
FIG. 1

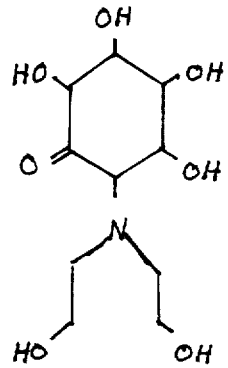
FIG. 2

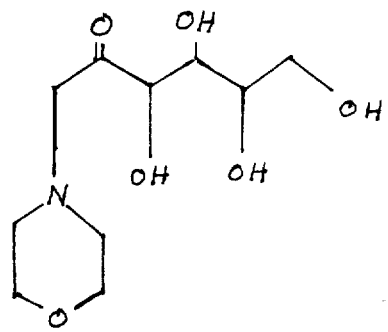
FIG. 3

Signed and Sealed this

Thirteenth Day of September, 1988

Attest:

DONALD J. QUIGG

Attesting Officer

Commissioner of Patents and Trademarks